United States Patent
Koseki et al.

(10) Patent No.: US 12,497,583 B2
(45) Date of Patent: Dec. 16, 2025

(54) ADHERENT CELL CULTURE SUBSTRATE, CULTURE VESSEL, CELL DETACHMENT METHOD, AND METHOD FOR PRODUCING ADHERENT CELL CULTURE SUBSTRATE

(71) Applicant: TOYO SEIKAN GROUP HOLDINGS, LTD., Tokyo (JP)

(72) Inventors: Osamu Koseki, Kanagawa (JP); Satoshi Tanaka, Kanagawa (JP); Yosuke Matsuoka, Kanagawa (JP); Takaharu Nishiyama, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 977 days.

(21) Appl. No.: 17/671,682

(22) Filed: Feb. 15, 2022

(65) Prior Publication Data

US 2022/0169969 A1    Jun. 2, 2022

Related U.S. Application Data

(63) Continuation of application No. PCT/JP2020/039337, filed on Oct. 20, 2020.

(30) Foreign Application Priority Data

Oct. 25, 2019   (JP) .................. 2019-194534

(51) Int. Cl.
  *C12M 1/12*   (2006.01)
  *C12M 1/00*   (2006.01)
  *C12N 5/074*  (2010.01)

(52) U.S. Cl.
  CPC ............ *C12M 25/06* (2013.01); *C12M 23/14* (2013.01); *C12M 47/04* (2013.01); *C12N 5/0696* (2013.01)

(58) Field of Classification Search
  CPC ...... C12M 25/06; C12M 23/14; C12M 47/04; C12N 5/0696
  (Continued)

(56) References Cited

U.S. PATENT DOCUMENTS 4,939,151 A  *  7/1990  Bacehowski .......... C12M 23/26
                                                              435/402
10,563,159 B2    2/2020  Ubukata et al.
                   (Continued)

FOREIGN PATENT DOCUMENTS

CN       108026501 A     5/2018
JP       H1-98599 U      6/1989
                   (Continued)

OTHER PUBLICATIONS

Office Action issued in Japanese Patent Application No. 2019-194534 mailed on Jan. 18, 2022, with English Translation (6 pages).
(Continued)

*Primary Examiner* — Michael L Hobbs
*Assistant Examiner* — Lenora A Abel
(74) *Attorney, Agent, or Firm* — Nakanishi IP Associates, LLC

(57) ABSTRACT

An adherent cell culture substrate, which is a sheet-shaped substrate used for producing a culture vessel for adherent cells, includes a groove including a crest-shaped portion and a valley-shaped portion on one surface side of the substrate, in which a distance from a top end portion of the crest-shaped portion to the other surface of the substrate is 1 mm or less. Further, it is preferable that a cross section of the groove perpendicular to a direction in which the groove extends is formed in a substantially V-shape and an inclination angle of a side surface of the substantially V-shape of the groove is 80 degrees or less. Further, it is preferable that a plurality of the grooves are linearly arranged in parallel
(Continued)

and the top end portions of the crest-shaped portions are formed in a linear shape.

5 Claims, 13 Drawing Sheets

(58) Field of Classification Search
USPC .................................................. 435/308.1
See application file for complete search history.

(56) References Cited

U.S. PATENT DOCUMENTS

| | | |
|---|---|---|
| 2004/0029266 A1 | 2/2004 | Barbera-Guillem |
| 2004/0067596 A1 | 4/2004 | Halverson et al. |
| 2004/0132177 A1 | 7/2004 | Heron |
| 2005/0163664 A1 | 7/2005 | Halverson et al. |
| 2007/0212266 A1 | 9/2007 | Johnston et al. |
| 2018/0201891 A1 | 7/2018 | Ubukata et al. |

FOREIGN PATENT DOCUMENTS

| | | |
|---|---|---|
| JP | H6-38734 A | 2/1994 |
| JP | 2003-503715 A | 1/2003 |
| JP | 2006-502408 A | 1/2006 |
| JP | 2011-143717 A | 7/2011 |
| JP | 2012-037683 A | 2/2012 |
| WO | 2014/148508 A1 | 9/2014 |
| WO | 2017/006942 A1 | 1/2017 |

OTHER PUBLICATIONS

Office Action issued in Chinese Patent Application No. 202080069327.8, dated Oct. 23, 2024, with English Translation of Substantial Part(21 pages).
Office Action issued in Chinese Patent Application No. 202080069327.8, dated Jul. 29, 2023, with English Translation of Substantial Part (17 pages).
Extended European Search Report issued in European Patent Application No. 20879373.7, dated Oct. 25, 2022 (9 pages).
International Search Report issued in PCT/JP2020/039337 mailed on Dec. 22, 2020 with English Translation (5 pages).
Wang, Peng-Yuan et al, "Grooved PLGA films incorporated with RGD/YIGSR peptides for potential application on skeletal muscle tissue engineering", Colloids and Surfaces B: Biointerfaces, 2013, vol. 110, pp. 88-95 (9 pages).

\* cited by examiner

Fig. 1
< A CASE WHERE ADHERENT CELLS ARE PRESENT ON UPPER SIDE OF STEP >
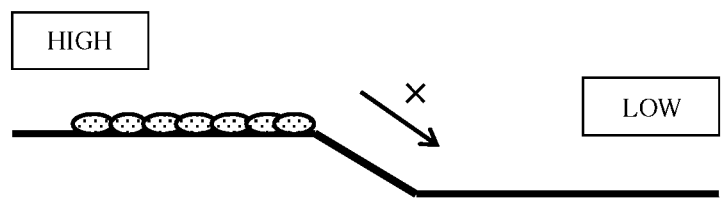
< A CASE WHERE ADHERENT CELLS ARE PRESENT ON LOWER SIDE OF STEP >
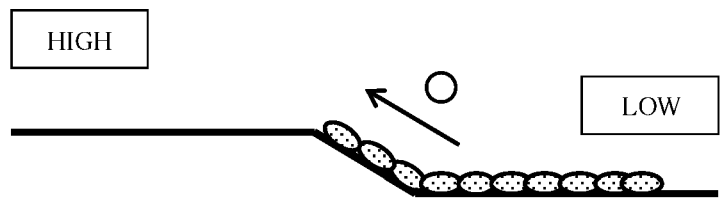

DEPTH OF GROOVE $b = \tan\theta \times a$
THICKNESS OF SUBSTRATE $h = b + c$
THICKNESS OF ORIGINAL MATERIAL $H = b / 2 + c$ Fig. 4
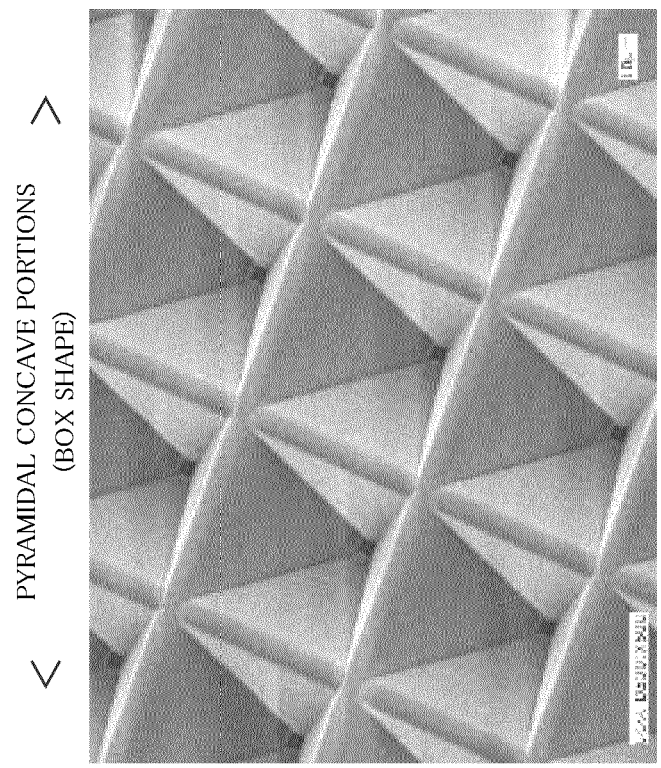
PYRAMIDAL CONCAVE PORTIONS (BOX SHAPE)
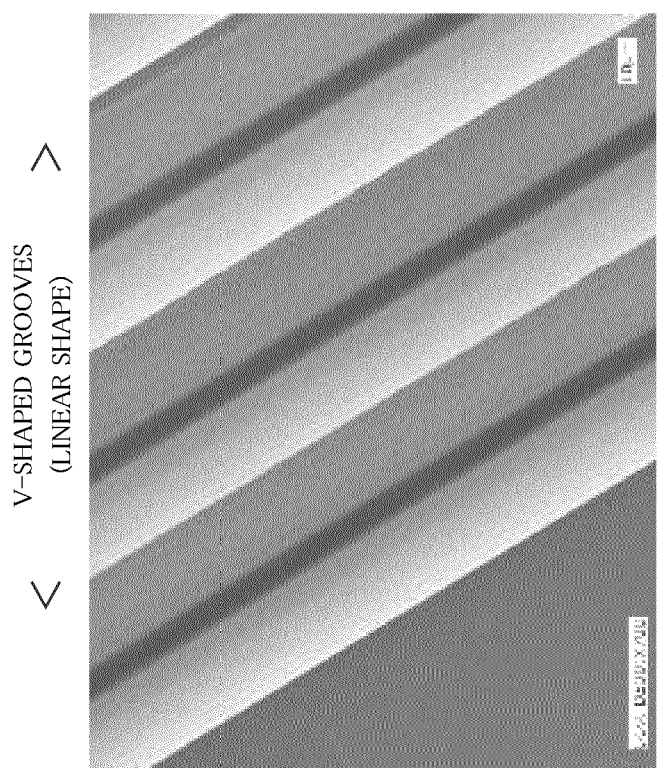
V-SHAPED GROOVES (LINEAR SHAPE)

Fig. 5

| V-SHAPE ANGLE (θ) | | CONTROL | 60 DEGREES | 65 DEGREES | 70 DEGREES | 75 DEGREES |
|---|---|---|---|---|---|---|
| FOLD CHANGE OF SURFACE AREA OF CULTURE PORTION (FOLD) | a | 1 | 2 | 2.37 | 2.92 | 3.86 |
| CELL DENSITY AT THE TIME OF SEEDING WITH RESPECT TO SURFACE AREA OF CULTURE PORTION (cells/cm$^2$) | b | 1,500 | 1,500 | 1,500 | 1,500 | 1,500 |
| CELL DENSITY AT THE TIME OF SEEDING WITH RESPECT TO BOTTOM SURFACE AREA OF VESSEL (cells/cm$^2$) | c (= a × b) | 1,500 | 3,000 | 3,555 | 4,380 | 5,790 |
| SEEDED CELL NUMBER (CELLS) | d (= c × 50) | 75,000 | 150,000 | 177,750 | 219,000 | 289,500 |
| CELL NUMBER AT THE TIME OF COMPLETION OF CULTURE (CALCULATED VALUE) | e (= d × g) | 15,150,000 | 21,450,000 | 25,418,250 | 31,317,000 | 41,398,500 |
| INCREASE IN CELL NUMBER | f (= e − d) | 15,075,000 | 21,300,000 | 25,240,500 | 31,098,000 | 41,109,000 |
| PROLIFERATION RATE IN 7-DAY CULTURE (FOLD) | g | 202 | 143 | 143 | 143 | 143 |

Fig. 6

| | | CONTROL | 60 DEGREES | 65 DEGREES | 70 DEGREES | 75 DEGREES |
|---|---|---|---|---|---|---|
| V-SHAPE ANGLE (θ) | | | 60 DEGREES | 65 DEGREES | 70 DEGREES | 75 DEGREES |
| FOLD CHANGE OF SURFACE AREA OF CULTURE PORTION (FOLD) | a | 1 | 2 | 2.37 | 2.92 | 3.86 |
| CELL DENSITY AT THE TIME OF SEEDING WITH RESPECT TO SURFACE AREA OF CULTURE PORTION (cells/cm²) | b | 2,250 | 2,250 | 2,250 | 2,250 | 2,250 |
| CELL DENSITY AT THE TIME OF SEEDING WITH RESPECT TO BOTTOM SURFACE AREA OF VESSEL (cells/cm²) | c (= a × b) | 2,250 | 4,500 | 5,333 | 6,570 | 8,685 |
| SEEDED CELL NUMBER (CELLS) | d (= c × 50) | 112,500 | 225,000 | 266,625 | 328,500 | 434,250 |
| CELL NUMBER AT THE TIME OF COMPLETION OF CULTURE (CALCULATED VALUE) | e (= d × g) | 17,662,500 | 32,625,000 | 38,660,625 | 47,632,500 | 62,966,250 |
| INCREASE IN CELL NUMBER | f (= e − d) | 17,550,000 | 32,400,000 | 38,394,000 | 47,304,000 | 62,532,000 |
| PROLIFERATION RATE IN 7-DAY CULTURE (FOLD) | g | 157 | 145 | 145 | 145 | 145 |

Fig. 7

| | V-SHAPE ANGLE (θ) | 60 DEGREES | 65 DEGREES | 70 DEGREES | 75 DEGREES | 83 DEGREES |
|---|---|---|---|---|---|---|
| | SURFACE AREA FOLD CHANGE | 2-FOLD | 2.37-FOLD | 2.92-FOLD | 3.86-FOLD | 8.21-FOLD |
| PROCESSING PERFORMANCE | PRODUCIBILITY OF PROCESSING DIE | ○ | ○ | ○ | ○ | × |
| | PROCESSABILITY OF PRODUCT TO BE PROCESSED | ○ | ○ | ○ | ○ | × |

Fig. 9

| V-SHAPE ANGLE (θ) | | CONTROL | | | 60 DEGREES | | |
|---|---|---|---|---|---|---|---|
| SAMPLE NUMBER | | 1 | 2 | 3 | 4 | 5 | 6 |
| SURFACE AREA OF CULTURE PORTION (cm$^2$) | a | 50 | 50 | 50 | 100 | 100 | 100 |
| CELL DENSITY AT THE TIME OF SEEDING (cells/cm$^2$) | b | 1,500 | 1,500 | 1,500 | 1,500 | 1,500 | 1,500 |
| SEEDED CELL NUMBER (CELLS) | c (= a × b) | 75,000 | 75,000 | 75,000 | 150,000 | 150,000 | 150,000 |
| CELL NUMBER AT THE TIME OF COMPLETION OF CULTURE (7-DAY CULTURE) | d | 13,750,000 | 16,500,000 | 15,300,000 | 22,600,000 | 19,800,000 | 21,800,000 |
| PROLIFERATION RATE (FOLD) | e (= d ÷ c) | 183 | 220 | 204 | 151 | 132 | 145 |
| AVERAGE PROLIFERATION RATE (FOLD) | | | 202 | | | 143 | |
| CELL DENSITY ON DAY 7 (cells/cm$^2$) | f (= d ÷ a) | 275,000 | 330,000 | 306,000 | 226,000 | 198,000 | 218,000 |

Fig. 10

| V-SHAPE ANGLE (θ) | | CONTROL | | | | 60 DEGREES | | | |
|---|---|---|---|---|---|---|---|---|---|
| SAMPLE NUMBER | | 7 | 8 | 9 | 10 | 11 | 12 |
| SURFACE AREA OF CULTURE PORTION (cm$^2$) a | | 50 | 50 | 50 | 100 | 100 | 100 |
| CELL DENSITY AT THE TIME OF SEEDING (cells/cm$^2$) b | | 2,250 | 2,250 | 2,250 | 2,250 | 2,250 | 2,250 |
| SEEDED CELL NUMBER (CELLS) c (= a × b) | | 112,500 | 112,500 | 112,500 | 225,000 | 225,000 | 225,000 |
| CELL NUMBER AT THE TIME OF COMPLETION OF CULTURE (7-DAY CULTURE) d | | 18,100,000 | 17,100,000 | 17,900,000 | 32,500,000 | 32,180,000 | 32,900,000 |
| PROLIFERATION RATE (FOLD) e (= d ÷ c) | | 161 | 152 | 159 | 144 | 143 | 146 |
| AVERAGE PROLIFERATION RATE (FOLD) | | | 157 | | | 145 | |
| CELL DENSITY ON DAY 7 (cells/cm$^2$) f (= d ÷ a) | | 362,000 | 342,000 | 358,000 | 325,000 | 321,800 | 329,000 |

Fig. 12

| THICKNESS OF SUBSTRATE (H) | 0.42mm | 0.6mm | 0.9mm | 1.1mm |
|---|---|---|---|---|
| THICKNESS OF BOTTOM PORTION (c) | 0.03mm | 0.41mm | 0.51mm | 0.71mm |
| DETACHMENT RATE | 95% OR MORE | 95% OR MORE | 90% | 50% |

ADHERENT CELL CULTURE SUBSTRATE, CULTURE VESSEL, CELL DETACHMENT METHOD, AND METHOD FOR PRODUCING ADHERENT CELL CULTURE SUBSTRATE

TECHNICAL FIELD

The present invention relates to a cell culture technique, in particular, a substrate used in a culture vessel for an adherent cell, and the like.

BACKGROUND ART

In recent years, in the field of drug production, gene therapy, regenerative medicine, immunotherapy, and the like, it is required to efficiently culture cells, tissues, and the like in large quantities under an artificial environment.

When adherent cells such as iPS cells, neural stem cells, embryonic stem cells, hepatic cells, islet cells, cardiomyocytes, and corneal endothelial cells are cultured in large quantities while being allowed to adhere to a surface (a culture portion) where cells are cultured in a culture vessel, the yield of these cells is limited by a surface area of the culture portion. Thus, it is beneficial if the yield of the adherent cells can be increased by producing the culture vessel having a large surface area of the culture portion.

As such a culture vessel having a large surface area of the culture portion, for example, a multistage cell culture vessel, which is a culture vessel formed by stacking a plurality of culture portions in multiple stages in a manner such that a medium is allowed to flow through between the culture portions, is commercially available (Corning® CellSTACK, etc.). Using such a culture vessel makes it possible to culture the adherent cells in large quantities.

When the cells are recovered after completion of the culture of the adherent cells, the adherent cells which adhere to the culture portion as well as to one another are not easily detached from the culture portion simply by tapping the culture vessel or the like, making it difficult to recover the cells. Thus, in general, the cells are dissociated by using a dissociation agent (a cell-dissociation enzyme, TrypLE™ Select, from Thermo Fisher Scientific, etc.) and then recovered by pipetting or the like.

However, when the multistage cell culture vessel such as the one described above is used, there is a problem in which performing the pipetting in the culture portion in each stage is extremely troublesome. Further, when such a rigid vessel is used, it is difficult to sufficiently detach the adherent cells by applying impact, for example, by tapping the vessel from the outside, after using the dissociation agent.

CITATION LIST

Patent Literature

Patent Literature 1: JP 06-38734 A
Patent Literature 2: JP-UM 01-98599 A

SUMMARY OF INVENTION

Technical Problem

On the other hand, it is also proposed that a culture vessel with a large surface area of the culture portion is obtained by forming a groove or a concave portion formed in a special shape on a culture surface of the culture vessel.

Specifically, in a culture vessel described in Patent literature 1, lines having a V shape are formed in the culture portion, making it possible to obtain a larger culture area as compared with a normal culture vessel with the same size. Further, in a culture vessel described in Patent literature 2, a surface area of the culture portion is increased by forming not only V shaped lines, but also concave portions having a conical shape and a hemispheric shape.

However, when the adherent cells are cultured by using such a culture vessel of which the culture area is increased by forming the V shaped line or the like in the culture portion, there is a problem in which it is very difficult to detach the adherent cells from the culture vessel when recovering the cells.

That is, there is a problem in which it is very difficult to recover the cells by performing pipetting after using the dissociation agent since the groove or the concave portion in a special shape is formed in the culture portion and this makes it difficult to detach the adherent cells from the culture vessel.

Further, any of these culture vessels are made rigid and formed using a thick substrate, making it difficult to sufficiently detach the adherent cells by applying impact, for example, by tapping the vessel from the outside.

Thus, the present inventors have conducted extensive studies for obtaining a substrate which can increase a surface area of a culture portion in a culture vessel and allows adherent cells to be easily detached from the culture vessel after being cultured using the culture vessel. As a result, the present inventors have succeeded in developing an adherent cell culture substrate capable of achieving such a goal.

Specifically, a groove such as a V-shaped line is formed as a configuration of the adherent cell culture substrate, and conditions have been found which allow the adherent cells to be easily detached from a culture surface after culturing the adherent cells on the surface of the substrate by applying impact, for example, by tapping the vessel from the outside, after using a dissociation agent.

Further, producing the culture vessel by using such an adherent cell culture substrate makes it possible to obtain the culture vessel which allows the adherent cells to be cultured in large quantities and easily detached.

In particular, producing the culture vessel having a bag shape (a culture bag) by using such an adherent cell culture substrate makes it possible to obtain the culture vessel which allows the cells to be efficiently recovered by tapping the culture vessel from the outside.

The present invention has been made in view of the above circumstances and an object of the present invention is to provide an adherent cell culture substrate, a culture vessel, a cell detachment method, and a method for producing the adherent cell culture substrate, which allow adherent cells to be cultured in large quantities and easily detached from the culture vessel.

Solution to Problem

For achieving the above object, an adherent cell culture substrate of the present invention, which is a sheet-shaped substrate used for producing a culture vessel for an adherent cell, includes a groove including a crest-shaped portion and a valley-shaped portion on one surface side of the substrate, the groove being configured such that a distance from a top end portion of the crest-shaped portion to the other surface of the substrate is 1 mm or less.

Further, the adherent cell culture substrate of the present invention is preferably configured such that a cross section of the groove perpendicular to a direction in which the groove extends is formed in a substantially V-shape and an inclination angle of a side surface of the substantially V-shape of the groove is 80 degrees or less.

Further, the culture vessel of the present invention is a culture vessel produced by using the above adherent cell culture substrate and configured such that a side of the adherent cell culture substrate on which the groove is provided is included as a culture portion.

Further, the cell detachment method of the present invention is a cell detachment method using the above culture vessel, including steps of filling the culture vessel with the adherent cells and a medium, culturing the adherent cells on a surface of the groove, discharging the medium after completing the culture, filling the culture vessel with a dissociation liquid, discharging the dissociation liquid from the culture vessel after a certain period of time, filling the culture vessel with the medium, and applying impact to the culture vessel from the outside, thereby detaching the adherent cells from the surface of the groove.

Further, the method for producing the adherent cell culture substrate of the present invention includes steps of subjecting a surface of a sheet-shaped material used for producing the culture vessel for the adherent cells to a surface treatment for making the substrate adhesive to the adherent cells and then providing a groove including the crest-shaped portion and the valley-shaped portion on one surface side of the material, the groove being processed such that the cross section of the groove perpendicular to a direction in which the groove extends is formed in a substantially V-shape and an inclination angle of the side surface of the substantially V-shape of the groove is 80 degrees or less, so as to form the adherent cell culture substrate, and, prior to the surface treatment, selecting the material having a thickness allowing a distance from the top end portion of the crest-shaped portion to the other surface of the material to be adjusted to 1 mm or less.

Advantageous Effects of Invention

According to the present invention, it becomes possible to provide the adherent cell culture substrate, the culture vessel, the cell detachment method, and the method for producing the adherent cell culture substrate, which allow the adherent cells to be cultured in large quantities and easily detached from the culture vessel.

BRIEF DESCRIPTION OF DRAWINGS

FIG. 1 is an explanatory diagram illustrating a unique characteristic (directionality of growth with respect to a culture surface) shown by adherent cells during growth.

FIG. 4 is an explanatory diagram illustrating the grooves having a V-shape (a linear shape) formed in the adherent cell culture substrate according to one embodiment of the present invention and concave portions having a pyramid shape (a box shape) formed in a sphere cell culture substrate.

FIG. 5 is a diagram illustrating calculation values of increase in cell number (a cell density at the time of seeding is 1500 cells/cm$^2$) obtained with the culture vessels formed by using the adherent cell culture substrates according to one embodiment of the present invention and a culture vessel formed by using a control substrate.

FIG. 6 is a diagram illustrating the calculation values of the increase in cell number and the like (the cell density at the time of seeding is 2250 cells/cm$^2$) obtained with the culture vessels formed by using the adherent cell culture substrates according to one embodiment of the present invention and the culture vessel formed by using the control substrate.

FIG. 7 is a diagram illustrating processing performance (producibility of a processing die and processability of a product to be processed) of the adherent cell culture substrates having various V-shape angles in Test 1.

FIG. 9 is a diagram illustrating a proliferation rate and the like of the cells (the cell density at the time of seeding is 1500 cells/cm$^2$) obtained with the culture vessels formed by using the adherent cell culture substrate (including the grooves having a V-shape of 60 degrees) in Test 2 and the culture vessels formed by using the control substrate.

FIG. 10 is a diagram illustrating the proliferation rate and the like of the cells (the cell density at the time of seeding is 2250 cells/cm$^2$) obtained with the culture vessels formed by using the adherent cell culture substrate (including the grooves having a V-shape of 60 degrees) in Test 2 and the culture vessels formed by using the control substrate.

FIG. 12 is a diagram illustrating a detachment result (a detachment rate) of the adherent cells for the various thickness of the substrates when the adherent cells are cultured in the culture vessels formed by using the adherent cell culture substrates in Test 3.

DESCRIPTION OF EMBODIMENTS

Hereinafter, an embodiment of an adherent cell culture substrate, a culture vessel, a cell detachment method, and a method for producing the adherent cell culture substrate of the present invention will be described in detail. However, the present invention is not limited to the following embodiments and the specific contents thereof.

Figure 2:
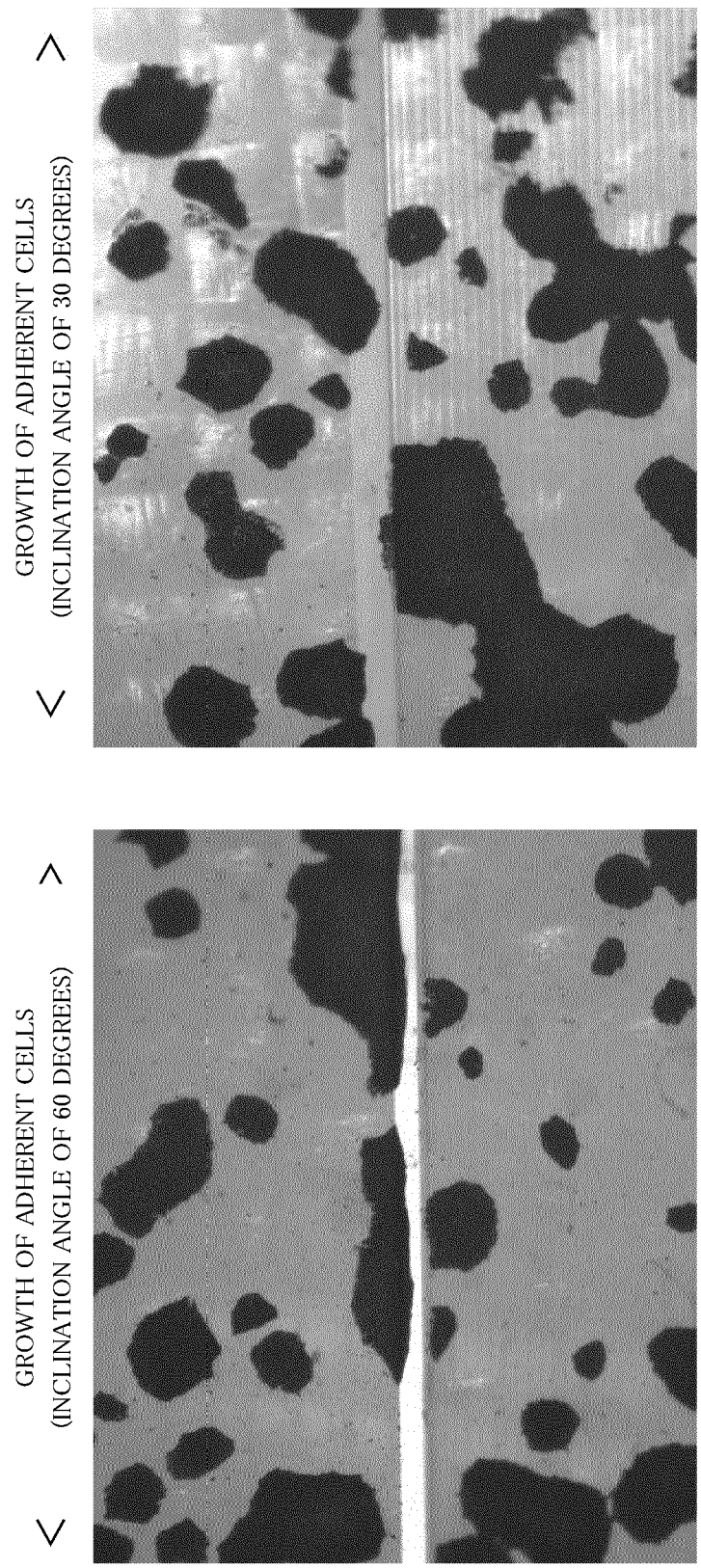
FIG. 2 is photographs showing the unique characteristic (the directionality of growth with respect to the culture surface) shown by the adherent cells during growth.

First, the finding of the present inventors that have led the inventors to the present invention will be described by using FIG. 1 and FIG. 2. FIG. 1 is an explanatory diagram of a unique characteristic (directionality of growth with respect to a culture surface) shown by the adherent cells during growth, and FIG. 2 is photographs showing such a characteristic.

While culturing the adherent cells using a culture vessel including a culture surface with a step and observing the growth of the adherent cells, the present inventors have noticed that there is regularity in the directionality of the growth.

That is, as shown in FIG. 1, in a case where the adherent cells are present and growing on an upper side (an upper step) of a step, it is observed that the adherent cells do not grow while expanding to a slope of the step and a lower side (a lower step) of the step.

On the other hand, in a case where the adherent cells are present and growing on the lower side of the step, it is observed that the adherent cells grow while expanding to the slope of the step, although they do not grow while expanding to the upper side of the step.

An inclination angle of the step of the culture surface in the left photograph in FIG. 2 is 60 degrees and the inclination angle of the step of the culture surface in the right photograph is 30 degrees. Further, in both photographs, lower columns represent the upper steps and upper columns represent the lower steps, and the images are captured from the upper side of the paper. A part colored in black is a part where the cells grow. In both photographs, the adherent cells grow while expanding from the lower step to the slope but do not grow while expanding from the upper step to the slope. Further, although not shown, the same applies to a case where the inclination angle of the step is 90 degrees. The adherent cells grow while climbing from the lower step to the vertical surface but do not grow while descending from the upper step to the vertical surface.

As described above, it is found that, in a case where the slope extended toward the upper side is formed on the culture surface (in a case where the inclination angle toward the upper side is at least 30 degrees or more), the adherent cells can grow while expanding to the slope.

On the other hand, it is found that, in a case where the slope extended toward the lower side is formed on the culture surface (in a case where the inclination angle toward the lower side is at least 30 degrees or more), the adherent cells do not grow while expanding to the slope.

Thus, the adherent cells can climb a crest present in a travel direction but cannot expand downwardly beyond the crest.

From such a result, the present inventors have come to the conclusion that, for effectively increasing the culture area of the adherent cells, it is preferable to consider the directionality of the growth of the adherent cells, thereby completing the invention of an adherent cell culture substrate. A culture portion formed in the adherent cell culture substrate extends so as to facilitate the expansion and growth of the adherent cells by minimizing a slope extending to a lower side (with respect to a growth direction) where the adherent cells do not expand and grow. Further, the adherent cell culture substrate allows the adherent cells to be easily detached from the culture vessel after culture.

That is, the adherent cell culture substrate of the present embodiment, which is a sheet-shaped substrate used for producing the culture vessel for the adherent cells, includes a groove including a crest-shaped portion and a valley-shaped portion on one surface side of the substrate, the groove being configured such that a distance from a top end portion of the crest-shaped portion to the other surface of the substrate is 1 mm or less.

Further, in this adherent cell culture substrate, a cross section of the groove perpendicular to a direction in which the groove extends is preferably formed in a substantially V-shape. Hereinafter, the groove having such a shape is sometimes referred to as a "V-shaped groove".

Further, in the substantially V-shape, an inclination angle (hereinafter, sometimes referred to as a "V-shape angle") of a side surface of the substantially V-shape of the groove is preferably 80 degrees or less.

In this configuration, in a case where the inclination angle of the side surface of the substantially V-shape of the groove is 60 degrees, the surface area of the groove is two times larger than the surface area of the corresponding region without the groove.

Similarly, in a case where such an inclination angle is 65, 70, 75, and 80 degrees, the surface area of the groove becomes 2.37, 2.92, 3.86, and 5.67 times larger than the corresponding region without the groove, respectively.

Thus, from a point of the culture area, the larger inclination angle is more preferable. On the other hand, the larger inclination angle reduces processing performance by causing, for example, chipping of a tip end portion of a processing die or deformation of a tip of a processed product. In a case where the inclination angle is 83 degrees, the surface area of the groove becomes 8.21 times larger. However, it is difficult to produce the processing die with this inclination angle, thereby failing to process a product to be processed. The inclination angle is limited to about 80 degrees for producing the processing die and then producing the processed product by using this die.

Next, a configuration of such a V-shaped groove will be described with reference to FIG. 3. This diagram is an explanatory cross-sectional view illustrating the configuration and the like of the groove included in the adherent cell culture substrate of the present embodiment.

Figure 3:
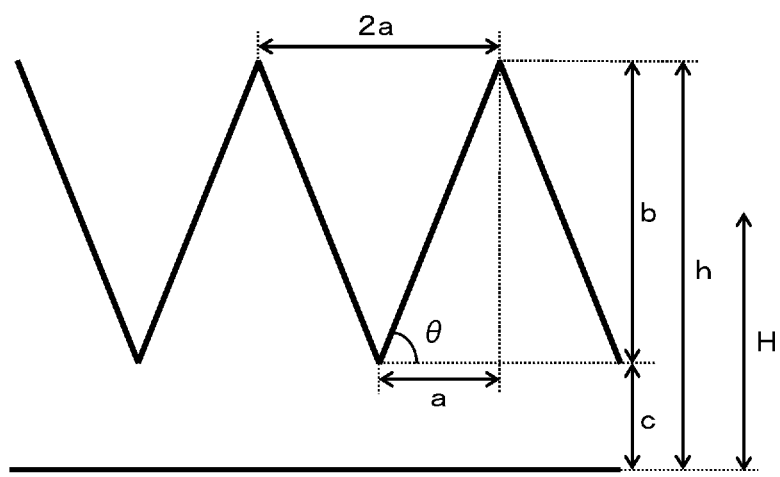
FIG. 3 is an explanatory cross-sectional view illustrating a configuration and the like of grooves included in an adherent cell culture substrate according to one embodiment of the present invention.

As shown in FIG. 3, the adherent cell culture substrate of the present embodiment is preferably configured such that a plurality of the V-shaped grooves are arranged in parallel on one surface side of the substrate (an upper side of the substrate in FIG. 3).

In this diagram, an angle $\theta$ is the inclination angle of the V-shaped groove (the V-shape angle) and represents an angle formed by the side surface of the V-shaped groove and a surface which is parallel to the other surface of the substrate (a lower surface of the substrate) and passes through the lowest point of the groove.

A distance a is a horizontal distance from the top end portion of the crest-shaped portion to the center of the groove (i.e., a horizontal distance from the lowest point of the groove to the center of the crest-shaped portion). A distance between the top end portions of the crest-shaped portions (a pitch) is represented by 2a.

A distance b is a depth of the groove and represents a vertical distance from the top end portion of the crest-shaped portion to the surface passing through the lowest point of the groove. That is, the depth of the groove is calculated as follows: $b = \tan\theta \times a$.

The distance c is a thickness of a bottom portion of the substrate and represents a distance obtained by subtracting the depth of the groove from the thickness of the substrate.

A distance h is a thickness of the substrate and calculated as follows: $h = b + c = \tan\theta \times a + c$.

A distance H is a thickness of an original material used for producing the adherent cell culture substrate of the present embodiment and calculated as follows: $H = b/2 + c = \tan\theta \times a/2 + c$.

The adherent cell culture substrate of the present embodiment described herein can be appropriately produced by placing a molding die on an object to be processed and performing heat transfer.

In this operation, a convex portion of the molding die corresponding to the groove of the substrate is pressed against the material to form the groove, and the material which was present in a part corresponding to the groove is pushed away to form the crest-shaped portion. Thus, the thickness of the substrate becomes larger than the thickness of the original material. Further, the V-shaped groove is configured to extend in an up-and-down direction with respect to the paper of FIG. 3. In this diagram, a relation of a×(H−c)=a×b/2 is satisfied. Thus, the thickness H of the original material is calculated by the above formula.

Further, the adherent cell culture substrate of the present embodiment is preferably configured such that the plurality of the grooves are linearly arranged in parallel and the top end portions of the crest-shaped portions are formed in a linear shape.

Specifically, as shown in the left photograph in FIG. 4, the V-shaped grooves are preferably formed in a linear shape.

The adherent cell culture substrate of the present embodiment having such a configuration allows the adherent cells to grow along the grooves formed in a linear shape, making it possible to effectively increase the culture area.

Note that, in the adherent cell culture substrate of the present embodiment, the top end portions of the crest-shaped portions may be formed in a planar shape.

On the other hand, as shown in the right photograph in FIG. 4, in a case of the culture surface having concave portions formed in a box shape, the culture area is substantially the same as that of the culture surface having the V-shaped grooves formed in a linear shape shown in the left photograph.

However, since the adherent cells do not grow while expanding to the slope extended toward the lower side, the adherent cells cultured in a given concave portion do not grow while expanding to its adjacent concave portions. Further, seeding the cells in each and every concave portion is not desirable from a point of the growth efficiency.

Thus, the culture surface having the concave portions formed in a box shape is not suitable for culturing the adherent cells.

Further, in the adherent cell culture substrate of the present embodiment, the plurality of the grooves may be arranged in a shape of concentric circles or concentric ellipses, and the top end portions of the crest-shaped portions may be formed in a circular shape or an elliptic shape. Further, in the adherent cell culture substrate of the present embodiment, one or more of the grooves may be arranged in a shape of spirals, and the top end portion of the crest-shaped portion may be formed in a spiral shape.

As a material of the adherent cell culture substrate of the present embodiment, a polyolefin-based resin such as polyethylene or polypropylene or the like can be appropriately used. Examples thereof include polyethylene, a copolymer of ethylene and α-olefin, a copolymer of ethylene and vinyl acetate, and an ionomer using a copolymer of ethylene and acrylic acid or methacrylic acid and a metal ion. Further, a polyolefin, a styrene-based elastomer, a polyester-based thermoplastic elastomer, a silicone-based thermoplastic elastomer, a silicone resin, and the like may be used. Further, silicone rubber, a soft vinyl chloride resin, a polybutadiene resin, an ethylene-vinyl acetate copolymer, a chlorinated polyethylene resin, a polyurethane-based thermoplastic elastomer, a polyester-based thermoplastic elastomer, a silicone-based thermoplastic elastomer, a styrene-based elastomer such as SBS (styrene-butadiene-styrene), SIS (styrene-isoprene-styrene), SEBS (styrene-ethylene-butylene-styrene), or SEPS (styrene-ethylene-propylene-styrene), a polyolefin resin, a fluorine-based resin, and the like may be used.

The adherent cell culture substrate of the present embodiment can be appropriately produced, for example, by placing the molding die on the object to be processed and performing the heat transfer as described above using these materials.

Specifically, for example, an object to be processed such as a polyethylene sheet is placed on a stand made of rubber or the like and overlaid with a molding die made of silicon or the like in which a desired pattern is processed on a silicon wafer surface. Note that the processing of the silicon wafer can be generally performed by dicing or etching. Next, a pressure plate is placed and heated to 150° C. Then, the molding die is pressed against the object to be processed for about several seconds at a pressure of 100 kPa or the like to perform transfer of the die, thereby producing the substrate.

The culture vessel of the present embodiment is characterized by being produced by using the adherent cell culture substrate of the present embodiment and having a side of the substrate where the groove is provided as the culture portion.

Further, the culture vessel of the present embodiment is preferably configured such that the culture vessel is formed in a bag shape by using an upper surface side member and a lower surface side member, and at least one of the upper surface side member and the lower surface side member is made of the adherent cell culture substrate of the present embodiment, and the culture vessel includes the culture portion in the culture vessel.

Further, the culture vessel of the present embodiment is preferably configured such that the upper surface side member and the lower surface side member are made of the adherent cell culture substrate of the present embodiment, and the culture vessel includes the culture portions on an upper surface side and a lower surface side in the culture vessel.

Further, this culture vessel is preferably configured such that a direction in which the groove in the upper surface side member extends and a direction in which the groove in the lower surface side member extends are not parallel to each other and an angle formed by these directions is substantially 90°.

The culture vessel of the present embodiment having such a configuration allows the adherent cells to grow along the groove formed in the substrate, thereby making it possible to effectively increase the culture area. Further, the substrate having a thickness of 1 mm or less makes it possible to easily detach the adherent cells by tapping the culture vessel from the outside after using the dissociation liquid. Further, the substrate having a thickness of 1 mm or less can increase gas permeability of the culture surface.

Further, the culture vessel formed in a bag shape makes it possible to detach the adherent cells more efficiently by tapping the culture vessel from the outside.

Further, providing the culture portions on both the upper surface side and the lower surface side in the culture vessel can further increase the culture area, and shifting the directions in which the grooves on the upper surface side and the lower surface side extend from each other can prevent the grooves on the upper surface side and the lower surface side from overlapping with each other and inhibiting the cell culture.

Here, culture performance of the culture vessel of the present embodiment will be described with reference to FIG. 5 and FIG. 6. These diagrams show what degree the culture performance can improve by increasing the culture area.

Each numeric value shown in association with a "V-shape angle (θ)" of 60 degrees, 65 degrees, 70 degrees, or 75 degrees indicates the culture performance of the culture vessel having the culture portion in which the groove of the corresponding V-shape angle is formed. Further, control indicates the culture performance of the culture vessel having the plane culture portion in which the groove of the V-shape angle is not formed.

A section "Fold change of surface area of culture portion" represents a fold change of the surface area of the culture portion in the culture vessel of the present embodiment with respect to the culture surface of the culture portion of the control. This section shows that the fold changes for the V-shape angle of 60 degrees, 65 degrees, 70 degrees, and 75 degrees are 2-fold, 2.37-fold, 2.92-fold, and 3.86-fold, respectively.

A section "Cell density at the time of seeding with respect to surface area of culture portion" represents an estimated cell density at the time of seeding. In FIG. 5, the cells are seeded at an estimated density of 1500 cells/cm$^2$ with respect to the surface area of the culture portion for all of the culture vessels, while, in FIG. 6, the cells are seeded at an estimated density of 2250 cells/cm$^2$ with respect to the surface area of the culture portion for all of the culture vessels.

A section "Cell density at the time of seeding with respect to bottom surface area of vessel" is an index for measuring a degree of cell density with respect to a bottom surface area of the vessel and calculated as follows: "Fold change of surface area of culture portion"×"Cell density at the time of seeding with respect to surface area of culture portion".

A section "Seeded cell number" is a calculated value in a case where the bottom surface area of the culture portion is 50 cm$^2$ and calculated as follows: "Cell density at the time of seeding with respect to bottom surface area of vessel"×50.

A section "Cell number at the time of completion of culture" is calculated using "Proliferation rate in 7-day culture" obtained in Test 2 in Example described below as follows: "Seeded cell number"×"Proliferation rate in 7-day culture".

A section "Increase in cell number" is calculated as follows: "Cell number at the time of completion of culture"–"Seeded cell number".

In FIG. 5, "Proliferation rate in 7-day culture" of the control and that of culture vessels of the present embodiment are 202-fold and 143-fold, respectively. Further, FIG. 6 shows numeric values under conditions where the cell density at the time of seeding is increased 1.5 times as compared with the conditions in FIG. 5. In this diagram, "Proliferation rate in 7-day culture" of the control and that of culture vessels of the present embodiment are 157-fold and 145-fold, respectively.

The proliferation rate of the control is larger than that of the culture vessels of the present embodiment. This is because, as described above, the adherent cells can climb the crest present in the travel direction but cannot expand downwardly beyond the crest. That is, the adherent cells cannot expand beyond the top end portion of the crest-shaped portion in the culture portion in which the V-shaped groove is formed, thus the proliferation rate becomes lower than that of the control.

Further, in the control, the proliferation rate is reduced from 202-fold to 157-fold when the cell density at the time of seeding is increased 1.5 times. However, in the culture vessels of the present embodiment, the proliferation rate remains substantially unchanged as 143-fold and 145-fold.

This is because, as shown in the result of Test 2 in Example described below, the control has a smaller area of the culture portion as compared with the culture vessels of the present embodiment. Thus, when the seeded cell number is increased to a certain number or more, there is not enough space for the cells to grow, and colonies (aggregates of the adherent cells) are connected to each other, making it difficult for the cells to grow further. The adherent cells are preferably cultured at a density of about 0.35 million cells/cm$^2$ or less. It is desirable to provide extra growth space in the culture of the adherent cells usually by limiting the number of the seeded cells.

The culture vessels of the present embodiment have the lower proliferation rate than the control. However, the number of the cells to be seeded can be increased.

Thus, in FIG. 5, as compared with the control having an increase in cell number of about 15.1 million cells, the culture vessels of the present embodiment with 60 degrees, 65 degrees, 70 degrees, and 75 degrees have an increase in cell number of about 21.3 million cells, 25.2 million cells, 31.1 million cells, and 41.1 million cells, respectively. Further, in FIG. 6, as compared with the control having an increase in cell number of about 17.6 million cells, the culture vessels of the present embodiment with 60 degrees, 65 degrees, 70 degrees, and 75 degrees have an increase in cell number of about 32.4 million cells, 38.4 million cells, 47.3 million cells, and 62.5 million cells, respectively.

As described above, according to the culture vessels of the present embodiment, it becomes possible to grow the cells significantly more efficiently than the control.

Further, the cell detachment method of the present embodiment is characterized by including steps of filling the culture vessel of the present embodiment with the adherent cells and the medium, culturing the adherent cells on the surface of the groove, discharging the medium after completing the culture, filling the culture vessel with the dissociation liquid, discharging the dissociation liquid from the culture vessel after a certain period of time, filling the culture vessel with the medium, and detaching the adherent cells from the surface of the groove by applying impact to the culture vessel from the outside.

The culture vessel of the present embodiment has the groove formed in the culture surface. However, the groove is formed using the substrate having a thickness of 1 mm or less, thus, according to the cell detachment method of the present embodiment, it is not difficult to detach the adherent cells from the surface of the groove. After the adherent cells are cultured, they can be easily detached by tapping the culture vessel from the outside after using the dissociation liquid.

Further, the method for producing the adherent cell culture substrate of the present embodiment is characterized by including steps of subjecting a surface of a sheet-shaped material used for producing the culture vessel for the adherent cells to a surface treatment for making the substrate adhesive to the adherent cells and then providing the groove including the crest-shaped portion and the valley-shaped portion on one surface side of the material, the groove being processed such that a cross section of the groove perpendicular to a direction in which the groove continues is formed in a substantially V-shape and an inclination angle of a side surface of the substantially V-shape of the groove is 80 degrees or less, thereby forming the adherent cell culture substrate, and, prior to the surface treatment, selecting the material having a thickness allowing a distance from a top end portion of the crest-shaped portion to the other surface to be adjusted to 1 mm or less.

That is, the adherent cell culture substrate of the present embodiment, which can be appropriately produced by the heat transfer or the like, is required to include the groove having a special shape as described above and to be formed so as to have a thickness of 1 mm or less.

Thus, as described above, this can be achieved by selecting the material having a thickness calculated by tan θ×a/2+c on the basis of the inclination angle (θ) of the side surface of the substantially V-shape of the groove, the horizontal distance (a) from the top end portion of the crest-shaped portion to the center of the groove, and the thickness (c) of the bottom portion of the substrate.

Further, the adherent cell culture substrate of the present embodiment is required to be subjected to the surface treatment (a corona treatment or an excimer treatment) to make the surface adhesive to the adherent cells. However, after the groove is formed on the surface of the substrate, a beam or light hardly enters inside the groove if the groove is small and deep, which may result in the insufficient surface treatment.

Thus, in the method for producing the adherent cell culture substrate of the present embodiment, the surface treatment is performed before the processing of the groove.

In this manner, according to the method for producing the adherent cell culture substrate of the present embodiment, the substrate can be appropriately produced.

Examples

Hereinafter, tests performed for confirming effects of the adherent cell culture substrate, the culture vessel, the cell detachment method, and the method for producing the adherent cell culture substrate according to the embodiment of the present invention will be described in detail.

[Test 1]

First, various molding dies for molding an adherent cell culture substrate of the present embodiment were produced.

Specifically, silicon dies in which a plurality of V-shaped grooves are linearly arranged in parallel and top end portions of crest-shaped portions are formed in a linear shape were produced. In this step, the dies having a V-shape angle (θ) of 60 degrees, 65 degrees, 70 degrees, and 75 degrees were produced. Note that it was unable to produce the die having a V-shape angle (θ) of 83 degrees.

Next, a polyethylene sheet (UMERIT 125FN, Ube-Maruzen Polyethylene) as an object to be processed was placed on a stand made of rubber and overlaid with the above-mentioned silicon made molding die. Then, a pressure plate was placed and heated to 150° C. Next, the silicon made molding die was pressed against the object to be processed at 100 kPa for 10 seconds to perform transfer of the die. At this moment, the polyethylene sheet surface reached about 110° C. The result is shown in FIG. 7.

As shown in FIG. 7, the processing dies having a V-shape angle (θ) of 60 degrees, 65 degrees, 70 degrees, and 75 degrees could be produced, and the adherent cell culture substrates could be processed by using these dies.

[Test 2]

A culture bag was produced by using the adherent cell culture substrate of the present embodiment and subjected to a culture test using the adherent cells.

Specifically, first, a polyethylene sheet (UMERIT 125FN, Ube-Maruzen Polyethylene) as an object to be processed was subjected to the surface treatment. As the surface treatment, a hydrophilization treatment was performed by using an excimer irradiation device (manufactured by M.D.COM. Inc.). In the present test, the hydrophilization treatment was performed three times under conditions of a voltage of 12 V, an irradiation distance of 4 mm, and an irradiation speed of 2 mm/s.

Next, the object to be processed was subjected to the heat transfer in the same manner as in Test 1 to produce the adherent cell culture substrates having a V-shape angle (θ) of 60 degrees and 75 degrees. Then, the following culture bags were produced by using these substrates.

First, the adherent cell culture substrate thus produced was used for a bottom surface side and the above-mentioned polyethylene sheet in which the groove was not formed was used for an upper surface side, thereby producing rectangular films having a long side of 15 cm and a short side of 8 cm.

Next, the bottom portion side film and the upper surface side film were overlaid with each other, and their peripheral portions were bonded by heat sealing to form the culture bag. At the time of bonding, a port was inserted in one side of the culture bag to produce the culture bag including one port. An area of the culture portion of the culture bag excluding a peripheral seal portion and a port installation portion is about 50 cm$^2$.

Six culture bags obtained by using the adherent cell culture substrate having a V-shape angle (θ) of 60 degrees and one culture bag obtained by using the adherent cell culture substrate having a V-shape angle (θ) of 75 degrees were prepared.

Further, as the control, six culture bags in which the above-mentioned polyethylene sheet was used in both the bottom portion side film and the upper surface side film were prepared.

Then, each culture bag was filled with StemFit® (AK-02N, Ajinomoto Healthy Supply Co., Inc.) as a medium and then seeded with adherent cells (an iPS cell 1231A3 cell line, Center for iPS Cell Research and Application, Kyoto University), followed by culturing for 7 days.

In this test, the cells were seeded at a density of 1500 cells/cm$^2$ in three culture bags (Samples 1 to 3) of the control, three culture bags (Samples 4 to 6) obtained by using the adherent cell culture substrate having a V-shape angle (θ) of 60 degrees, and the culture bag obtained by using the adherent cell culture substrate having a V-shape angle (θ) of 75 degrees. Further, the cells were seeded at a density of 2250 cells/cm$^2$ in three culture bags (Samples 7 to 9) of the control and three culture bags (Samples 10 to 12) obtained by using the adherent cell culture substrate having a V-shape angle (θ) of 60 degrees.

Then, after completing the 7-day culture, the cell number was counted in the culture bags of Samples 1 to 12. The cell number was counted by using a hemocytometer after the cells were detached by using TrypLE™ Select (Thermo Fisher Scientific) and suspended in the medium.

Figure 8:
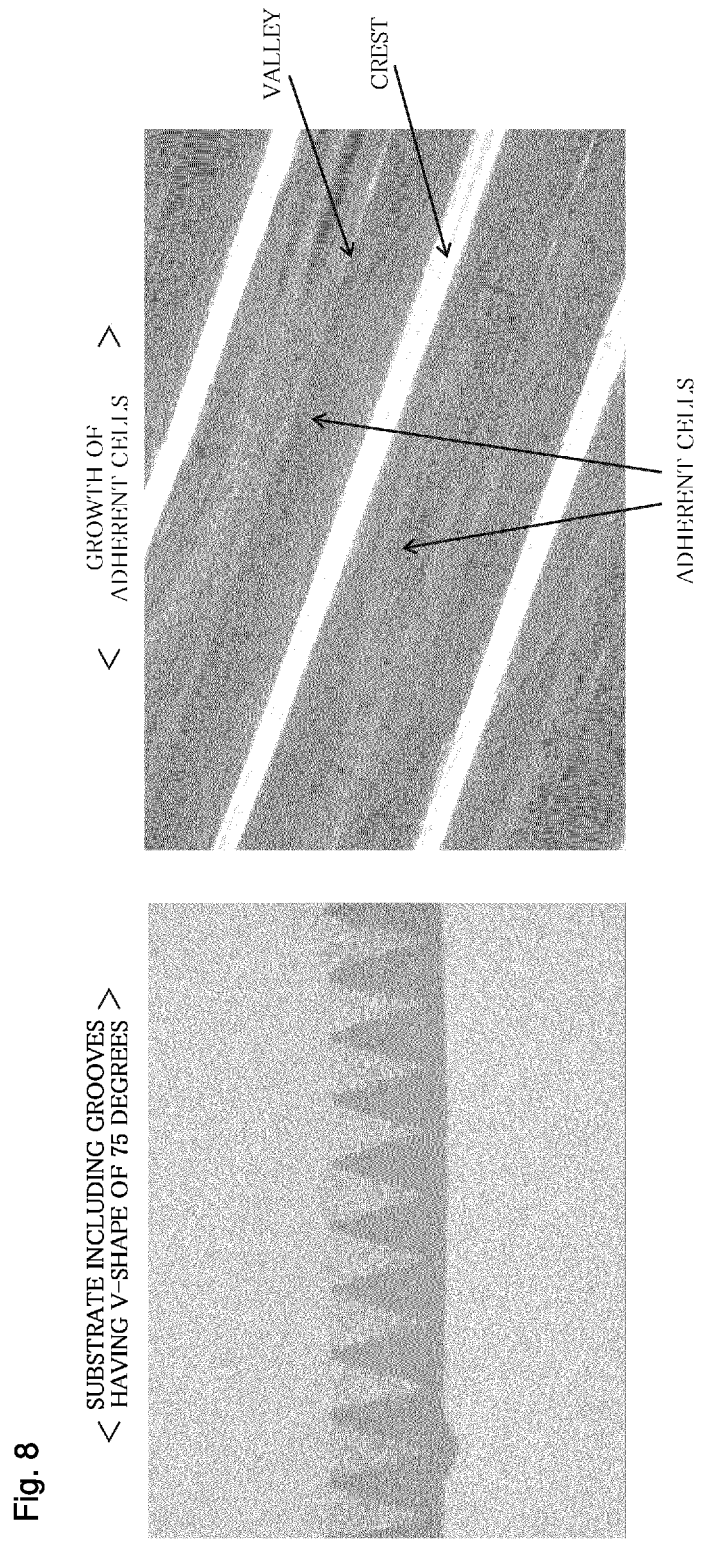
FIG. 8 is micrographs showing the adherent cell culture substrate (including grooves having a V-shape of 75 degrees) in Test 2 and a state of culturing the adherent cells in the culture vessel formed by using this substrate.

FIG. 8 shows a micrograph (left) of the substrate including the V-shaped grooves of 75 degrees thus produced and a state (right) of culturing the adherent cells in the culture bag produced by using this substrate. This diagram shows that the adherent cells grow on the side surfaces of the V-shaped grooves in the culture bag produced by using this substrate.

FIG. 9 shows the proliferation rate and the like of the cells seeded at a cell density of 1500 cells/cm$^2$ and FIG. 10 shows the proliferation rate and the like of the cells seeded at a cell density of 2250 cells/cm$^2$.

When the cell density at the time of seeding was 1500 cells/cm$^2$, the culture bags of the control had a proliferation rate of 183-fold, 220-fold, and 204-fold, with the average proliferation rate of 202-fold. On the other hand, the culture bags obtained by using the adherent cell culture substrate having a V-shape angle of 60 degrees had a proliferation rate of 151-fold, 132-fold, and 145-fold, with the average proliferation rate of 143-fold.

Further, the culture bags of the control had a cell density on Day 7 of 0.275 million cells/cm$^2$, 0.33 million cells/cm$^2$, and 0.306 million cells/cm$^2$, while the culture bags obtained by using the adherent cell culture substrate having a V-shape angle of 60 degrees had a cell density on Day 7 of 0.226 million cells/cm², 0.198 million cells/cm², and 0.218 million cells/cm².

When the cell density at the time of seeding was 2250 cells/cm², the culture bags of the control had a proliferation rate of 161-fold, 152-fold, and 159-fold, with the average proliferation rate of 157-fold. On the other hand, the culture bags obtained by using the adherent cell culture substrate having a V-shape angle of 60 degrees had a proliferation rate of 144-fold, 143-fold, and 146-fold, with the average proliferation rate of 145-fold.

Further, the culture bags of the control had a cell density on Day 7 of 0.362 million cells/cm², 0.342 million cells/cm², and 0.358 million cells/cm², while the culture bags obtained by using the adherent cell culture substrate having a V-shape angle of 60 degrees had a cell density on Day 7 of 0.325 million cells/cm², 0.321 million cells/cm², and 0.329 million cells/cm².

The proliferation rate of the culture bags of the control was lower when the cell density at the time of seeding was 2250 cells/cm² than that when the cell density at the time of seeding was 1500 cells/cm². It is speculated that this is because the increase in the cell density reduces the space necessary for the adherent cells to grow. Thus, it is considered difficult to properly amplify the cells to any further extent by increasing the cell number at the time of seeding by using the culture bags of the control.

On the other hand, with the culture bags obtained by using the adherent cell culture substrate having a V-shape angle of 60 degrees, the proliferation rate is maintained at about 145-fold whether the cell density at the time of seeding is 1500 cells/cm² or 2250 cells/cm².

Further, when the cell density at the time of seeding was 1500 cells/cm², the cell number at the time of completing the culture was from 13.75 million cells to 16.5 million cells with the culture bags of the control, while it was from 19.8 million cells to 22.6 million cells with the culture bags obtained by using the adherent cell culture substrate having a V-shape angle of 60 degrees. Further, when the cell density at the time of seeding was 2250 cells/cm², it was from 17.1 million cells to 18.1 million cells with the culture bags of the control, while it was from 32.18 million cells to 32.9 million cells with the culture bags obtained by using the adherent cell culture substrate having a V-shape angle of 60 degrees.

As described above, it was found that the cells could be efficiently cultured in large quantities by using the culture vessels of the present embodiment.

[Test 3]

The culture bags were produced by using the adherent cell culture substrates including the V-shaped grooves of 75 degrees. After culturing the adherent cells with these culture bags, a test of detaching the adherent cells was performed.

Specifically, the culture bags were produced by using the adherent cell culture substrates formed such that a thickness (H) of the substrate was adjusted to 0.42 mm, 0.6 mm, 0.9 mm, and 1.1 mm. A thickness (c) of the bottom portions corresponding to the thickness of these substrates is 0.03 mm, 0.41 mm, 0.51 mm, and 0.71 mm, respectively.

Figure 11:
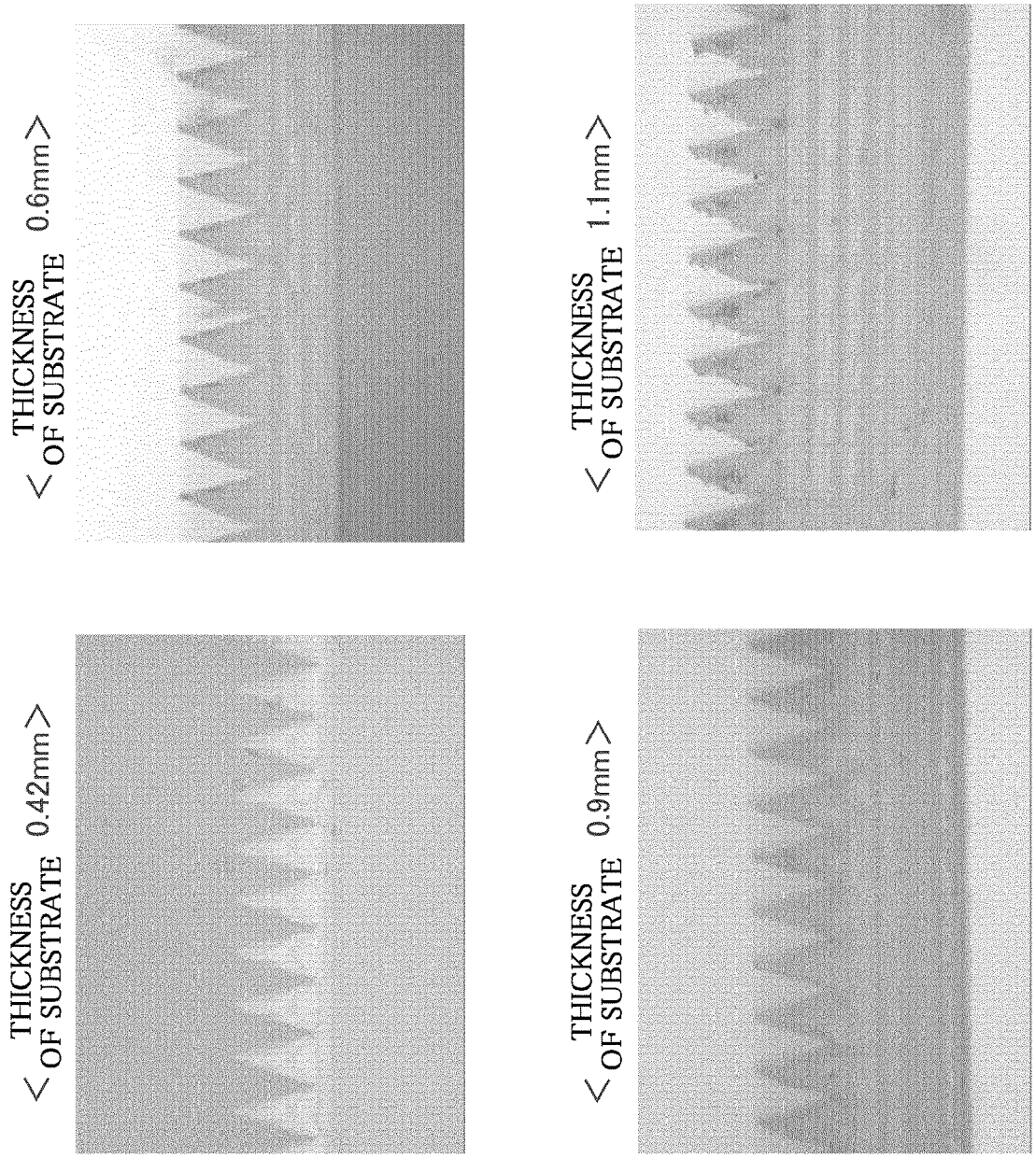
FIG. 11 is micrographs (cross sections perpendicular to a direction in which the V-shaped grooves extend) showing the adherent cell culture substrates formed with various thickness (0.42 mm, 0.6 mm, 0.9 mm, and 1.1 mm) in Test 3.

FIG. 11 shows micrographs (cross sections perpendicular to a direction in which the V-shaped grooves extend) of these adherent cell culture substrates.

In this test, the surface treatment of the material of the adherent cell culture substrates, the processing of the grooves by the heat transfer, and the production of the culture bags were performed in the same manner as in Test 2.

Next, each culture bag was filled with StemFit® (AK-02N, Ajinomoto Healthy Supply Co., Inc.) as a medium and then seeded with the adherent cells (an iPS cell 1231A3 cell line, Center for iPS Cell Research and Application, Kyoto University), followed by culturing for 7 days.

Subsequently, the medium was discharged, the culture bags were rinsed with PBS (phosphate-buffered saline), and then PBS was discharged. Next, a cell-dissociation enzyme (TrypLE™ Select, Thermo Fisher Scientific) diluted by two folds with PBS was added to the cells and the cells were allowed to stand at 37° C. for 5 minutes. Then, after discharging the cell-dissociation enzyme, the cells were rinsed with PBS and the medium was added to the cells.

Then, the adherent cells were detached by tapping each of the culture bags from the outside. Further, a detachment rate of the adherent cells was confirmed after the detachment. The detachment rate was confirmed by capturing images of a surface field of the culture vessels before and after the detachment and calculating an occupancy ratio of the cells in the adhesion portion. The result is shown in FIG. 12 and FIG. 13.

As shown in FIG. 12, the detachment rate of the culture bags having a thickness (H) of the substrate of 0.42 mm and 0.6 mm was 95% or more. Further, the detachment rate of the culture bag having a thickness (H) of the substrate of 0.9 mm was about 90%. On the other hand, the detachment rate of the culture bag having a thickness (H) of the substrate of 1.1 mm was about 50%.

Figure 13:
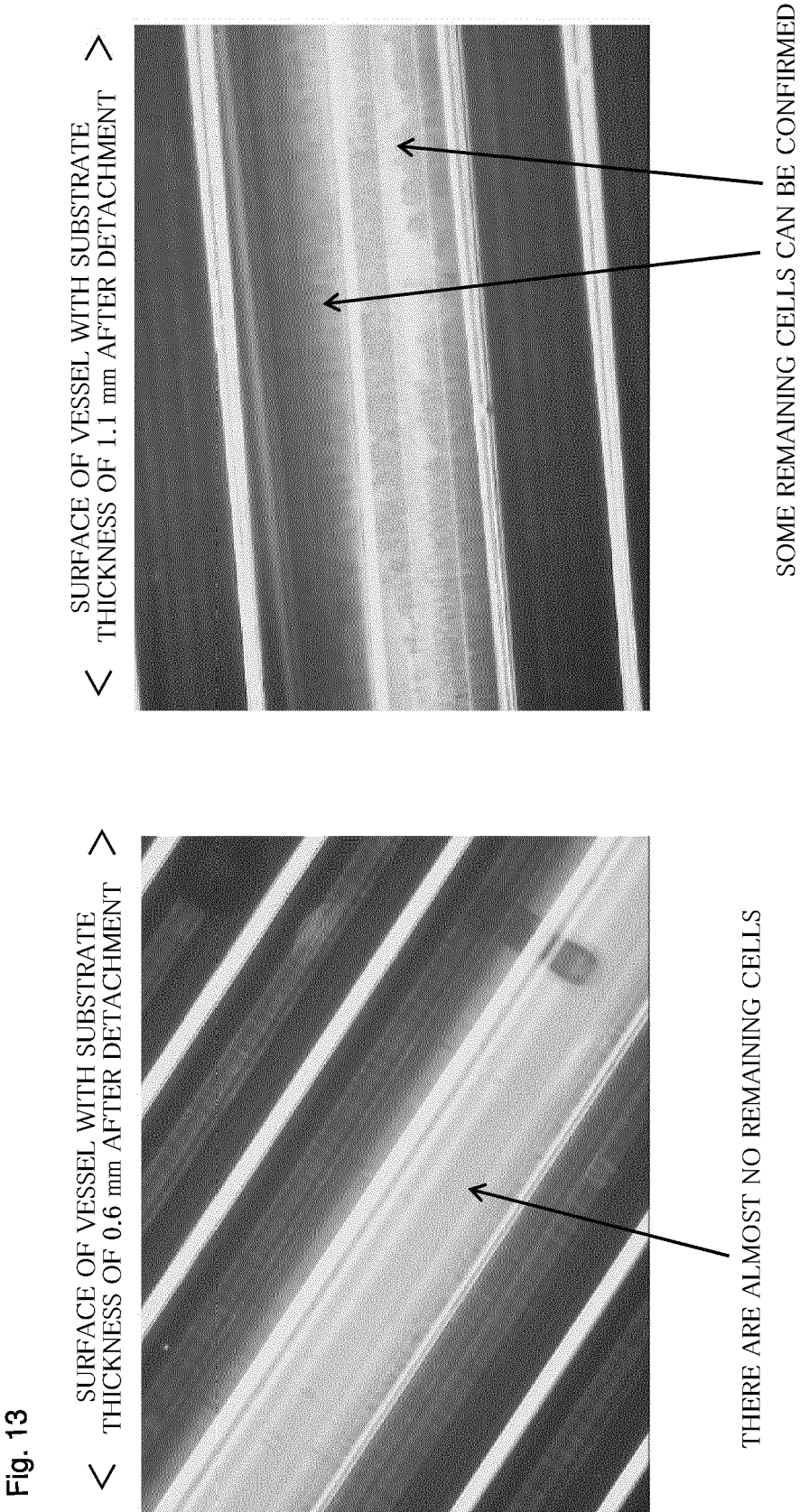
FIG. 13 is micrographs showing the detachment result of the adherent cells when the adherent cells are cultured in the culture vessels using the adherent cell culture substrates formed with the various thickness (0.6 mm and 1.1 mm) in test 3.

FIG. 13 shows micrographs of a surface (left) of the culture bag having a thickness (H) of the substrate of 0.6 mm after the detachment and a surface (right) of the culture bag having a thickness (H) of the substrate of 1.1 mm after the detachment.

There were almost no remaining cells in the culture bag on the left side, while there were some remaining cells in the culture bag on the right side.

From this result, it was found that excellent adherent cell detachment performance could be obtained when the thickness of the adherent cell culture substrate was 1 mm or less.

The present invention is not limited to the above embodiments and examples, and, needless to say, various modifications can be made within the scope of the present invention. For example, a modification of changing a layout of the groove of the adherent cell culture substrate from a linear shape to a curved shape can be appropriately made.

INDUSTRIAL APPLICABILITY

The present invention can be appropriately used, for example, when the adherent cells are efficiently produced in large quantities.

The entire contents of documents mentioned in this specification and the specification of the Japanese patent application to which this application claims priority under the Paris Convention are entirely incorporated by reference herein.

The invention claimed is:

1. A culture vessel comprising an adherent cell culture substrate, wherein:
   the adherent cell culture substrate in a sheet shape comprises a crest-shaped portion and a valley-shaped portion;
   a groove is formed between the crest-shaped portion and the valley-shaped portion, and is disposed on one surface side of the substrate;

a distance from a top end portion of the crest-shaped portion to another surface side of the substrate, which is a thickness of the substrate, is 1 mm or less;

a cross section of the groove perpendicular to a direction in which the groove extends has a V-shape, and an inclination angle of a side surface of the V-shape of the groove is 80 degrees or less; and a side of the adherent cell culture substrate where the groove is provided is included as a culture portion in the culture vessel.

2. The culture vessel according to claim 1, wherein the culture vessel is formed in a bag shape by using an upper surface side film and a lower surface side film, at least one of the upper surface side film and the lower surface side film is made of the adherent cell culture substrate, and the culture vessel includes the culture portion in the culture vessel.

3. The culture vessel according to claim 2, wherein the upper surface side film and the lower surface side film are made of the adherent cell culture substrate, and the culture vessel includes the culture portions on an upper surface side and a lower surface side in the culture vessel.

4. The culture vessel according to claim 3, wherein:

the groove is disposed in the upper surface side film and another groove is disposed in the lower surface side film;

a direction in which the groove in the upper surface side film extends and another direction in which the another groove in the lower surface side film extends are not parallel to each other.

5. The culture vessel according to claim 4, wherein an angle formed by the direction in which the groove in the upper surface side film extends and the another direction in which the another groove in the lower surface side film extends is 90 degrees.

* * * * *